No. 620,481. Patented Feb. 28, 1899.
H. T. MOODY.
ANCHORING DEVICE FOR BRICK WALLS.
(Application filed Jan. 17, 1898.)

(No Model.)

WITNESSES
Frank M. Edmonds
George M. Langdon

INVENTOR
Henry T. Moody

UNITED STATES PATENT OFFICE.

HENRY T. MOODY, OF NEWBURYPORT, MASSACHUSETTS, ASSIGNOR TO THE VICTOR MANUFACTURING COMPANY, OF SAME PLACE.

ANCHORING DEVICE FOR BRICK WALLS.

SPECIFICATION forming part of Letters Patent No. 620,481, dated February 28, 1899.

Application filed January 17, 1898. Serial No. 666,913. (No model.)

*To all whom it may concern:*

Be it known that I, HENRY T. MOODY, a citizen of the United States, residing at Newburyport, in the county of Essex and State of Massachusetts, have invented a new and useful Improvement in Anchoring Devices for Attaching Objects to Brick Walls, of which the following is a full, clear, and exact description, reference being had to the accompanying drawings, forming a part of this specification, in explaining its nature.

The invention comprises an anchoring device adapted to be secured to a wall of brick, stone, cement, or other material, which anchoring device contains one member of a fastening for securing or attaching to the wall a rail, plate, or any other support or thing.

The anchoring device consists of a nut or bolt holding block, preferably of metal, having two inclined sides oppositely arranged and two straight sides oppositely arranged, which is adapted to be inserted into a cavity in a wall or other formation of brick, stone, or other material and to be held or fastened in said cavity by two wedges, which are driven between the inclined sides of the block and the sides of the cavity to tightly wedge and fasten the block in the cavity to the wall. The block has a longitudinal hole, preferably centrally arranged, extending from its outer surface to its inner surface and enlarged at its inner end, which is adapted to receive and hold a section of a bolt and a nut or a headed bolt, the nut or head of the bolt being contained in the enlargement of the hole and the shank of the bolt extending through the hole outward to engage the thing which is to be fastened to the wall or other support or thing to which the anchoring device is secured.

Figure 1:
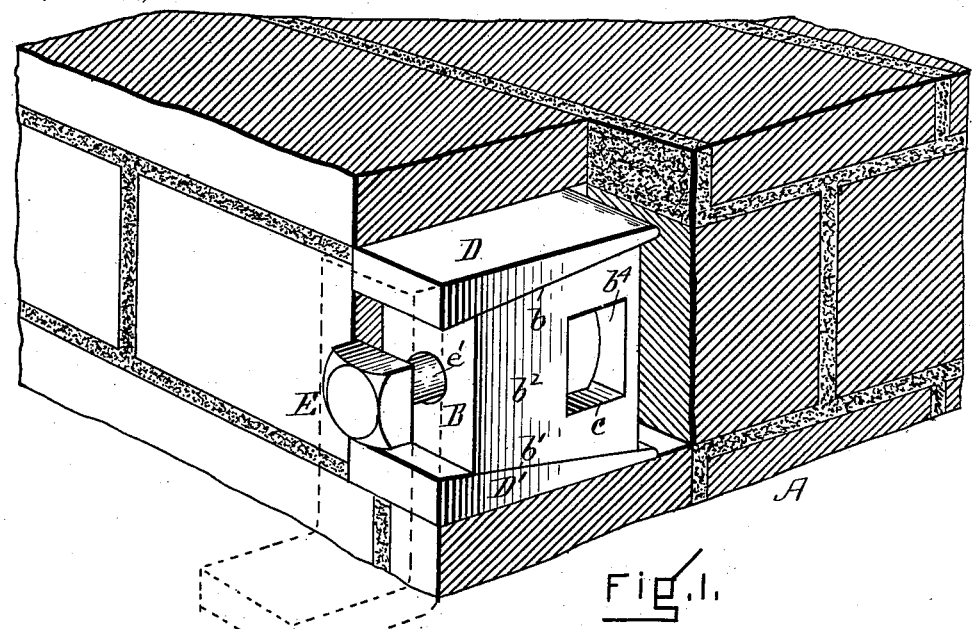
Figure 2:
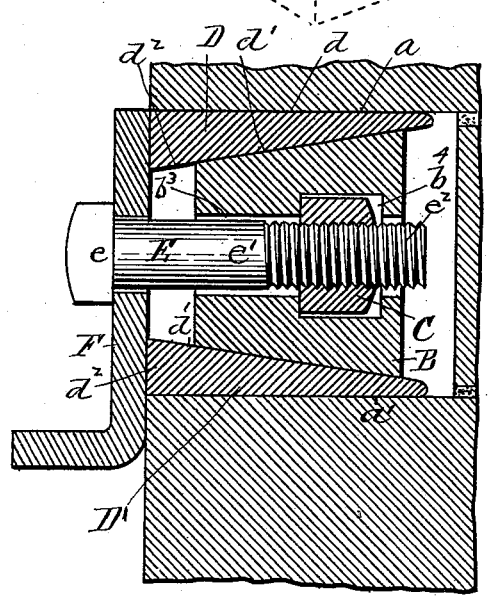
Figure 3:
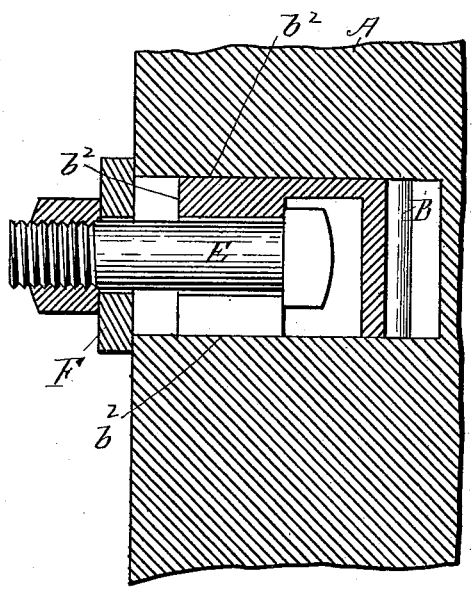

In the drawings, Figure 1 is a view in sectional perspective representing a portion of a brick wall and my anchoring device applied thereto, the angle-plate which it secures thereto being shown in dotted outline. Fig. 2 is a view in section through a part of the wall, anchoring device, and plate, further representing the construction of Fig. 1. Fig. 3 is a view of practically the same parts, illustrating a slight modification, to which reference is hereinafter made.

The anchoring device is represented as fastened to a brick wall, and A represents a portion of such a wall. $a$ is a cavity formed therein by the removal of a portion of a brick and is of a size to receive the anchoring device, the sides of the cavity being straight and parallel with each other.

B is the anchoring-block. It is preferably made of cast-iron and it has the oppositely-arranged straight sides $b^2$, the central hole $b^3$ extending lengthwise of the block from its outer end, and the nut or bolt holding cavity $b^4$, which is in line with the hole $b^3$ and which when a nut is employed is preferably provided with an opening $c$, extending to one side of the block.

D D' are wedges, each of which is preferably of the width of the block and also preferably slightly longer than the block. Each has a straight surface $d$, which bears against the face of the wall of the cavity, and an inclined surface $d'$, which bears against the inclined side of the block B. The two wedges and the block are placed in the cavity in the wall and the wedges driven hard home to wedge and fasten the block to the wall, the wedges binding between the inclined sides of the block and the sides of the wall.

E is the bolt, which forms a part of the anchoring device and which is adapted to fasten a bar, plate, or other similar device F to the wall. It has the head $e$, which bears against the outer surface of said bar or plate, the shank $e'$, the inner end of which is furnished with a screw-thread $e^2$, and which shank extends through a hole in said bar or plate and the hole in said block, and its threaded end screws into the nut C, held in the cavity $b^4$, which is rectangular or square and is of a size to hold the nut and prevent it from turning.

While I have described the anchoring device as applied to a brick or stone wall, I would not be understood as limiting it to such a use, as it may be employed wherever it is desired to attach or secure a bar, plate, or other device to a support having a chamber, cavity, or hole adapted to receive, contain, and hold the anchor-block and wedges in the manner above indicated. It will be observed also that the invention will be practiced if the bolt is reversed in respect to the block and the bar or plate F, or so that its head is contained in the nut-holding cavity of the block and its threaded end exposed to receive a holding-nut, as shown in Fig. 3. When the bolt is so employed, it may be inserted into the anchor-block through a side cavity or hole, (see Fig. 3,) or it may be inserted from the rear end of the block. I prefer as a rule, however, that the cavity be inclosed in whole or in part on the back side of the block in order that the nut or bolt may not have endwise movement in the block.

Having thus fully described my invention, I claim and desire to secure by Letters Patent of the United States—

The anchoring device herein described, the same comprising a block B having inclined surfaces $b$, $b'$ above and below, a nut-holder and a bolt-hole extending from said nut-holder lengthwise the block, in combination with the wedges D D', the inclined surface of each being adapted to rest against and cooperate with one of the inclined surfaces of said block, and the bolt E and nut C.

HENRY T. MOODY.

In presence of—
FRANK M. EDMONDS,
GEORGE W. LANGDON.